United States Patent [19]
Dohrmann et al.

[11] Patent Number: 5,468,033
[45] Date of Patent: Nov. 21, 1995

[54] IMPACT ABSORBING BUMPER MOUNT AND METHOD OF MAKING

[75] Inventors: Wolfgang Dohrmann, Eitorf-Irlenborn; Metin Ayyildiz, Köln, both of Germany

[73] Assignee: Fichtel & Sachs AG, Eitorf, Germany

[21] Appl. No.: 158,634

[22] Filed: Nov. 26, 1993

[30] Foreign Application Priority Data

Dec. 1, 1992 [DE] Germany .................... 42 40 364.2

[51] Int. Cl.⁶ .................... F16F 9/02; F16F 9/06; F16F 9/16; B62D 21/15
[52] U.S. Cl. .................... 293/133; 267/116; 267/139; 264/287; 188/371
[58] Field of Search .................... 293/133, 134, 293/136, 132, 102, 107, 110; 267/139, 140, 116, 64.11, 64.15, 64.26, 124; 188/371–377; 156/292, 293, 304.2; 264/173, 287

[56] References Cited

U.S. PATENT DOCUMENTS 4,641,872  2/1987  Löhr et al. .................... 188/376 X
4,988,081  1/1991  Dohrmann .................... 267/64.15
5,181,589  1/1993  Siegner et al. .................... 293/133

FOREIGN PATENT DOCUMENTS 3419165  11/1985  Germany .

*Primary Examiner*—Douglas C. Butler
*Attorney, Agent, or Firm*—Nils H. Ljungman & Associates

[57] ABSTRACT

Impact-absorbing bumper mount with two telescoping tubes, in particular for motor vehicles, to decelerate a vehicle via damping forces when the vehicle strikes an obstacle, whereby a work piston is guided in a sealed manner in one of the tubes, and with which, in addition to a weight reduction, it is also possible to simplify the fabrication process, reduce costs and achieve sufficient corrosion protection. The invention teaches that this problem can be solved by tubes which have recesses on their inside and outside, and which are coated with a polymeric material.

20 Claims, 3 Drawing Sheets

IMPACT ABSORBING BUMPER MOUNT AND METHOD OF MAKING

BACKGROUND OF THE INVENTION

1. Field of the Invention

This invention relates to an impact-absorbing bumper mount having two telescoping tubes, in particular for motor vehicles, and a method for making the bumper mount. Such a bumper mount can generally be configured to decelerate a vehicle by means of damping forces when the vehicle strikes another obstacle. This is essentially accomplished by means of a work piston which is guided in a sealed manner in one of the tubes.

2. Background Information

One type of impact-absorbing bumper mount of this type is known from German Patent No. 34 19 165, which German Patent has a corresponding equivalent U.S. Pat. No. 4,641,872. In this particular mount, two telescoping tubes are used, and the work piston is located inside the movable tubes. The work piston is already designed as a tubular component, which not only simplifies the fabrication process, but also saves a significant amount of weight, without adversely affecting strength. The damping forces which occur when the vehicle strikes an obstacle can be achieved by means of a gas cushion, hydraulic forces or a combination of the two. Such an impact-absorbing bumper mount must generally also be appropriately coated to achieve sufficient protection against corrosion, to thereby extend the life of the bumper mount, and insure that the parts do not adhere together.

OBJECT OF THE INVENTION

The object of the invention is to create an impact-absorbing bumper mount on which not only can an additional weight reduction and a further increase in strength be achieved, but on which the cost can also be reduced, while simultaneously preventing corrosion. A further object is to provide a method for making such a bumper mount.

SUMMARY OF THE INVENTION

The present invention teaches that this object can essentially be achieved by tubes which have recesses therein, and which, on their inner and outer sides, are preferably coated with a polymeric material. Such a polymeric material could also be termed an elastic material.

An advantage of such an embodiment is that the tubes are used essentially only as reinforcement for the elastic, or polymeric material, so that not only is a weight reduction achieved, with a simultaneous reduction of fuel consumption, but the fabrication is also simplified because no welding or painting is generally required. In addition to reducing costs, this measure also achieves sufficient corrosion protection.

In one embodiment which is particularly simple from a fabrication point of view, the tubes can preferably be roll-shaped from sheet metal, and then coated with the elastic material.

In an additional favorable embodiment, the elastic material can preferably be rubber or plastic.

An additional feature is that the recesses can preferably be holes extending through the tubes. The use of recesses or holes in the tubular components can provide for a connection of the elastic material from the inside to the outside of the tube in question, so that there is no reason to fear any settling of the elastic material. In other words, the elastic material which passes through the holes, can essentially be contiguous about the tubes.

In one configuration of the invention, the recesses can preferably be distributed uniformly over the surface.

An additional feature of the invention is that when plastic is used, preferably a glass fiber and/or carbon fiber reinforcement can be used.

One advantage of the present invention, is that the tubes can be fabricated as steel beams from two shells, or cylinders, roll-bent from strip material, and can be fastened together by spraying the tubes with preferably a glass fiber and/or carbon fiber reinforced plastic. The piston required to achieve the damping forces could also be made of plastic, whereby the medium in the tubes, regardless of the external configuration, could be conventional pneumatic or hydraulic medium, or a combination of the two.

One aspect of the invention resides broadly in an impact absorbing bumper mount for mounting a bumper to a motor vehicle to absorb an impact of the motor vehicle during a collision with an obstacle. The mount comprises a first tubular member, the first tubular member defining a longitudinal axis, and the first tubular member having an interior surface and an exterior surface, a second tubular member at least partially disposed within the first tubular member, the second tubular member being movable into and out of the first tubular member along the longitudinal axis of the first tubular member, and the second tubular member having an interior surface and an exterior surface, a device for attaching the first tubular member to one of the bumper and the motor vehicle, a device for attaching the second tubular member to the other of the bumper and the motor vehicle, a work piston device connected to the first tubular member, the work piston device being movably disposed within the second tubular member, at least the second tubular member comprising a protective coating on at least the exterior surface thereof; and the protective coating being configured to minimize adherance of the first tubular member to the second tubular member.

Another aspect of the invention resides broadly in an impact absorbing bumper mount for mounting a bumper to a motor vehicle to absorb an impact of the motor vehicle during a collision with an obstacle. The mount comprises a first tubular member, the first tubular member defining a longitudinal axis, and the first tubular member having an interior surface and an exterior surface, a second tubular member at least partially disposed within the first tubular member, the second tubular member being movable into and out of the first tubular member along the longitudinal axis of the first tubular member, and the second tubular member having an interior surface and an exterior surface, a device for attaching the first tubular member to one of the bumper and the motor vehicle, a device for attaching the second tubular member to the other of the bumper and the motor vehicle, and a work piston device connected to the first tubular member, the work piston device being movably disposed within the second tubular member. At least the second tubular member comprises: a first rigid tubular member, the first rigid tubular member having an exterior surface disposed thereabout, and the first rigid tubular member comprising a plurality of spaced apart recesses in the exterior surface to reduce the weight of the first rigid tubular reinforcement member.

At least one additional aspect of the invention resides braodly in a method for producing impact absorbing bumper mounts for mounting a bumper to a motor vehicle to absorb an impact of the motor vehicle during a collision with an obstacle. The method comprises the steps of: forming a first tubular member, the first tubular member defining a longitudinal axis, the first tubular member having an interior surface and an exterior surface, and the first tubular member comprising a work piston disposed therewithin and attached to the first tubular member; forming a second tubular member, the second tubular member having an interior surface and an exterior surface, and the second tubular member having a first end and a second end; providing an attachment device for attaching the second tubular member to one of the bumper and the motor vehicle, the attachment device having an exterior surface; disposing the attachment device at least adjacent the first end of the second tubular member; applying a coating material about at least the exterior surface of each of the second tubular member and the attachment device to form an integral coating between at least the second tubular member and the attachment device to connect together the second tubular member and the attachment device; and at least partially disposing the second end of the second tubular member within the first tubular member, with the work piston device within the second tubular member, the second tubular member being movable into and out of the first tubular member along the longitudinal axis of the first tubular member.

BRIEF DESCRIPTION OF THE DRAWINGS

Preferred embodiments of the invention are illustrated schematically in the accompanying drawings, in which.

DESCRIPTION OF THE PREFERRED EMBODIMENTS

Figure 1:
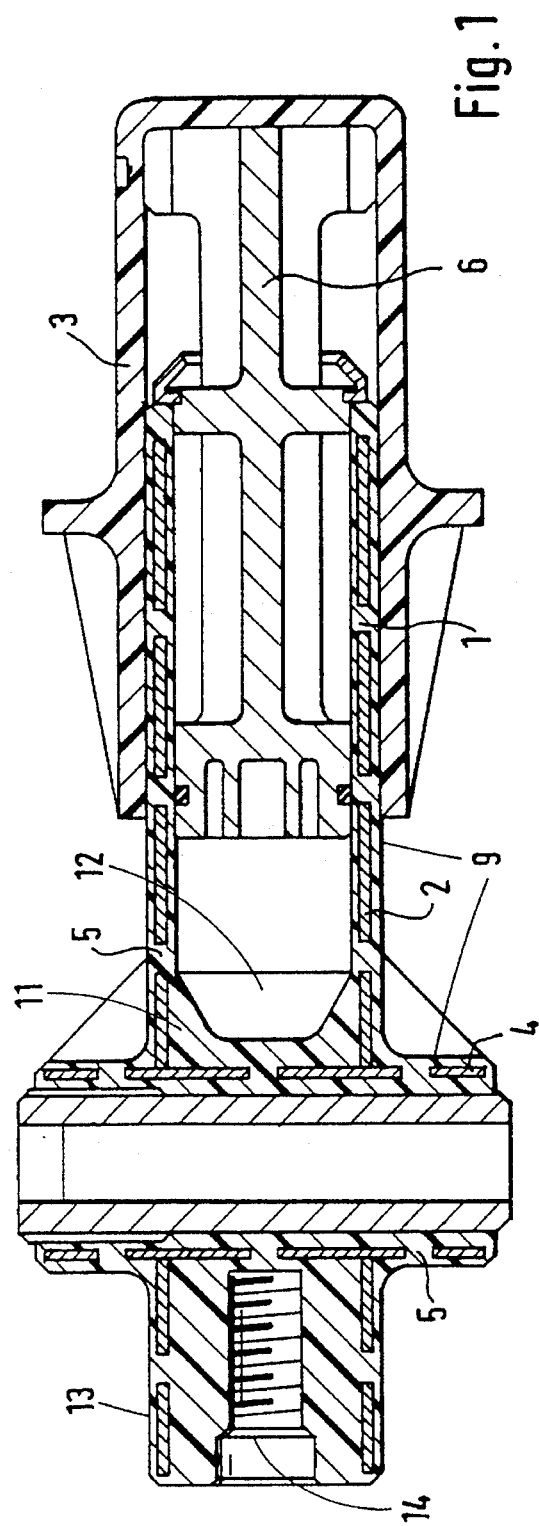
FIG. 1 shows a longitudinal section through an impact-absorbing bumper mount with a roll-bent tube and elastic coating.

The impact-absorbing bumper mount illustrated in FIG. 1 has telescoping tubes 2 and 3, wherein tube 2 is at least partially disposed within tube 3. With such a configuration, tube 2 is slidably movable within tube 3 in a direction along the longitudinal axes of the tubes, to thereby allow for expansion or contraction of the tubes with respect to one another. In addition to the two tubes 2 and 3, there can also preferably be an additional tube 4 oriented perpendicularly in the tube 2. After fabrication, this tube 4 can preferably be used as a fastening device for fastening the mount to one of the bumper (not shown), or the body of the motor vehicle (also not shown).

In one embodiment of the present invention, as illustrated by FIG. 1, the tube 3 can preferably be made of solid plastic, while the tubes 2 and 4 can be made of roll-bent steel sheet with a corresponding coating 9 of preferably polymeric, or elastic material. In essence, the steel sheet of the tubes 2 and 4 can preferably be individually shaped, followed by insertion of the tube 4 through an opening 8. The tubes 2 and 4 can then preferably be coated simultaneously to fasten the tubes 2 and 4 together. To provide a sufficient connection between the tubes 2 and 4, there can preferably be corresponding recesses 1 in both of the tubes, which recesses 1 can provide a connection of the polymeric, or elastic material from the inside of the tubes to the outside of the tubes, and from tube 2 to tube 4.

A piston 6 can preferably be fastened to an end of the tube 3 to extend into the inner tube 2. By including appropriate damping media, a damping force can be achieved during the telescoping of the tube 2 into the tube 3. Such a telescoping could essentially occur during an impact of the bumper with a foreign object, thereby driving the tube 2 into the tube 3.

Figure 2:
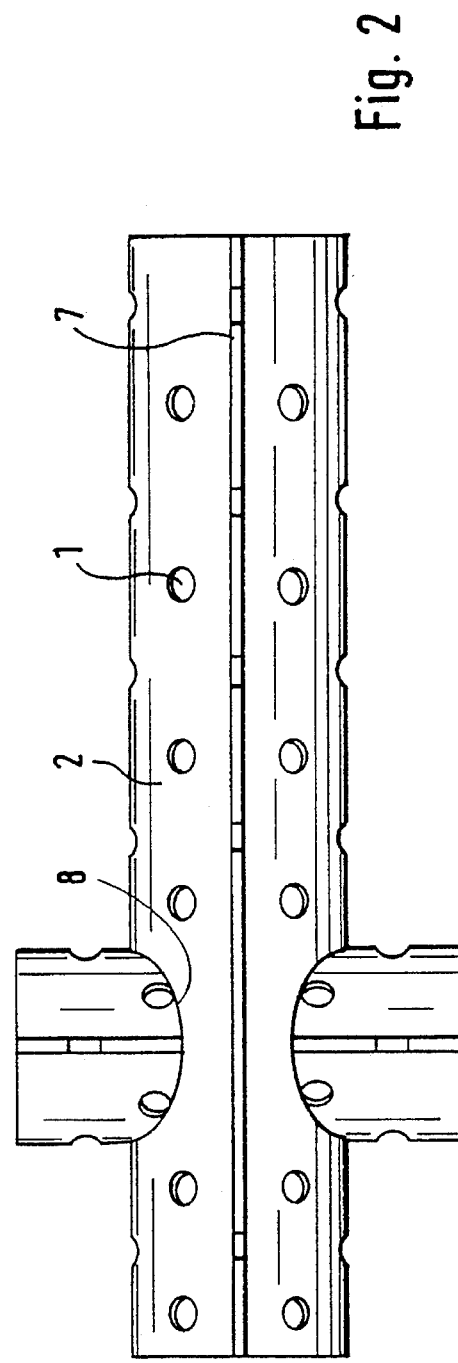
FIG. 2 shows a detailed view of two roll-bent tubes as a single unit.

FIG. 2 shows a detailed view of the tube 2 and the tube 4 without the elastic coating applied thereto. As briefly mentioned above, the tubes 2 and 4 can preferably be made of roll-bent strip material. As such, after the rolling of the strip material, there will generally be a corresponding seam 7 on the front side of the rolled tubes. The present invention further provides that the two tubes 2 and 4 do not necessarily need to be connected by welding, but can preferably be connected by spraying a coating of elastic material therearound, which material, when hardened can maintain the tubes in a fixed relationship with one another. The coating 9 of elastic material can also thereby serve to hold the sheet metal of the tubes in the cylindrical shape, whereby the seam 7 also does not necessarily need to be welded.

In essence, the coating material can be sprayed onto the surfaces of the tubes, while appropriate molds can also be provided for molding the coating material about the tubes. When the material is molded, the inner plug 11 can be configured to have a dome shaped recess 12 as shown, while the end 13 of the tube 2 could be completely filled with the elastic material and molded to include an additional fastening device 14.

The configuration of holes 1 in the sheet metal should preferably be such that the integrity, or strength of the metal is not substantially affected. As shown in the figures, the holes can be arranged in rows, with holes in any one row being offset diagonally from holes in any adjacent row. Such an array could essentially be termed a regular, repeating diagonal array.

Figure 3:
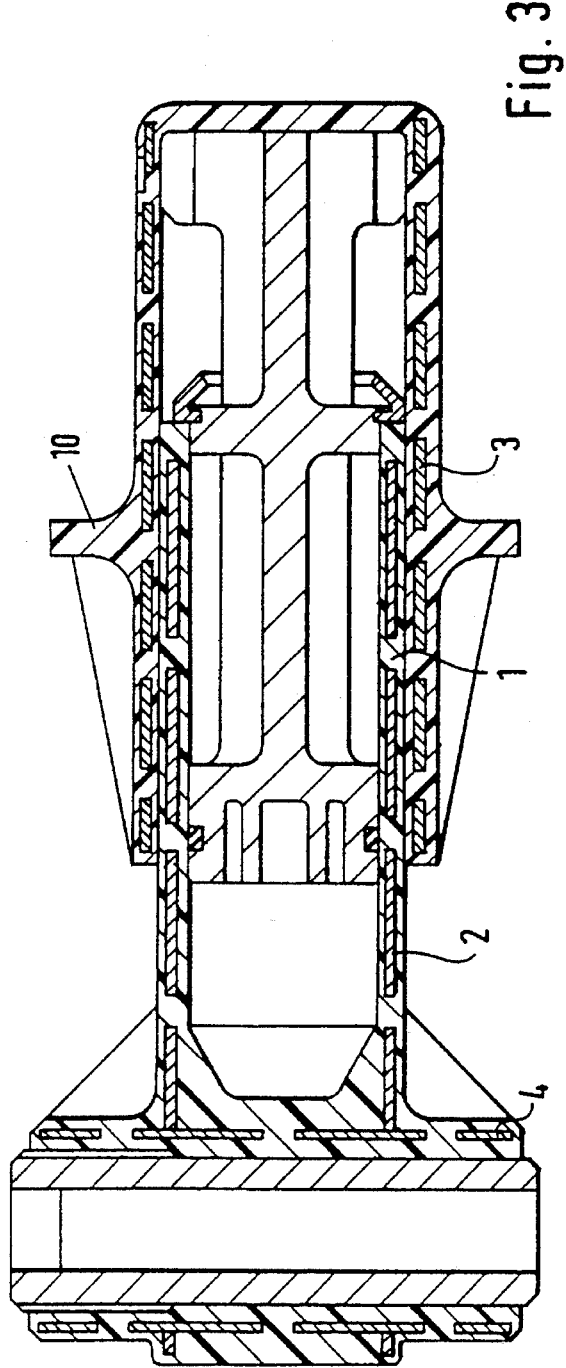
FIGS. 3 and 4 show an additional embodiment of an impact-absorbing bumper mount, on which three different tubes are used.
Figure 4:
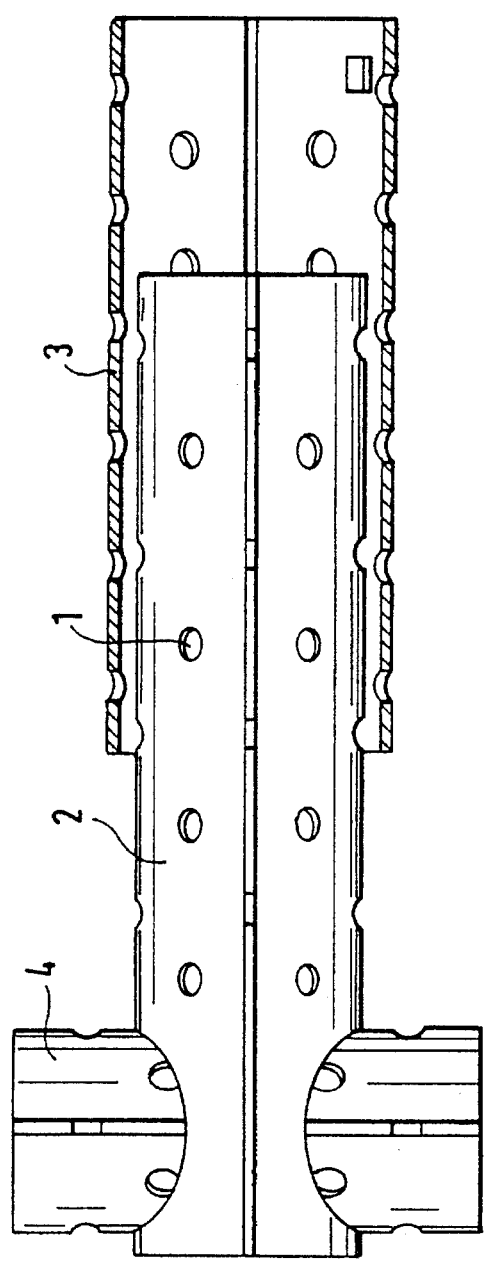

An additional embodiment of an impact-absorbing bumper mount, as illustrated by FIGS. 3 and 4, provides that the tube 3 can also be fabricated as a jacketed, or steel tube. In a similar manner as discussed above, on this tube 3, the polymeric, or elastic material can, in turn, be located on the inside and the outside of the tube, whereby the coating on the inside and the outside can be connected to one another through the recesses 1, so that sufficient strength is achieved, and settling of the elastic material can be prevented. The elastic material on the tube 3 can also preferably be shaped into flange portions 10, which can preferably serve as fastening flanges for fastening the tube 3 to either the motor vehicle or the bumper.

Figure 5:
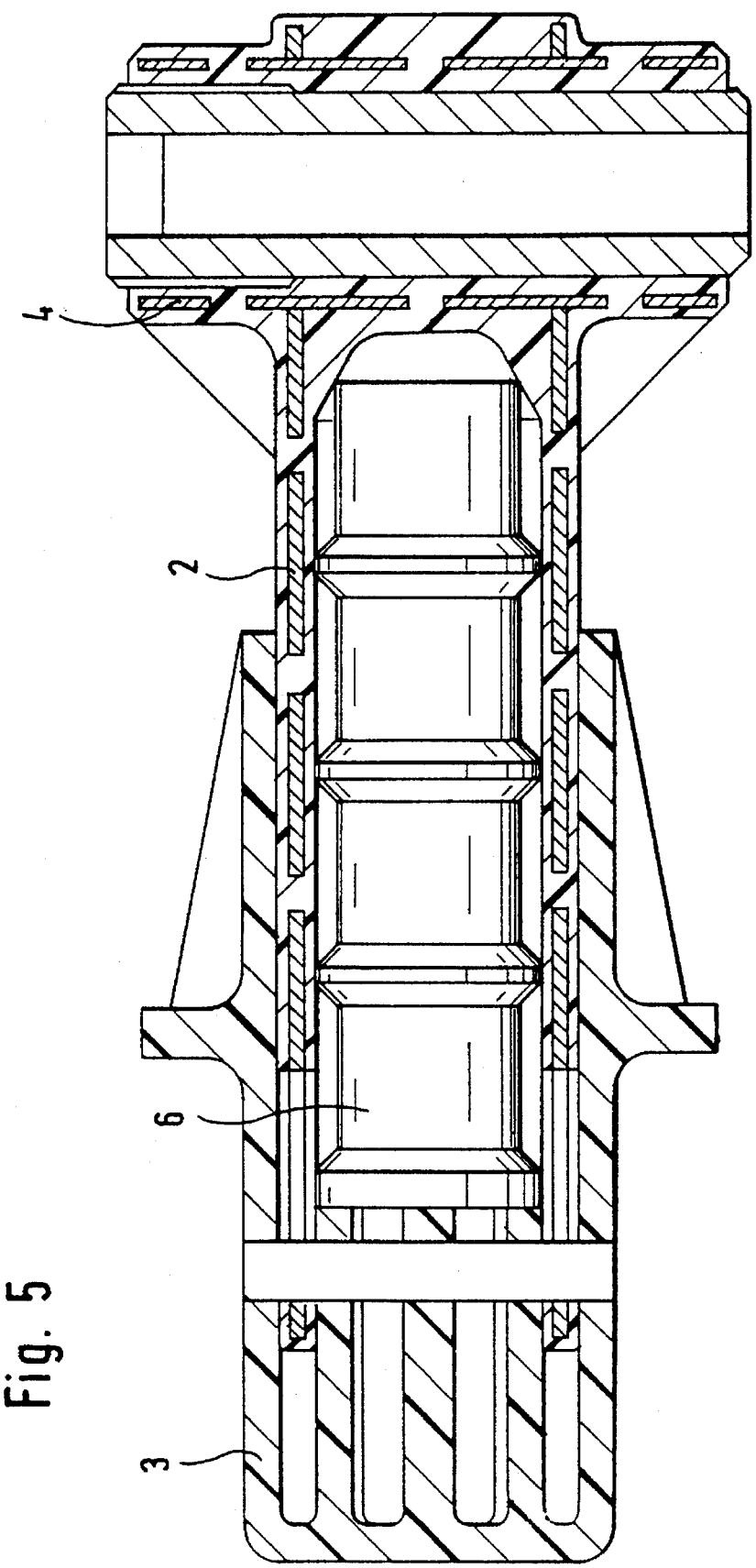
FIG. 5 shows an impact-absorbing bumper mount in cross section, on which the piston is made of elastic material.

An alternative embodiment of an impact-absorbing bumper mount, as illustrated in FIG. 5, provides that the tube 2 can preferably be a rolled steel tube with a jacket of elastic material as discussed previously, while the tube 3 can preferably be made of a corresponding elastic material without a corresponding steel reinforcement. In addition, this embodiment, which is essentially the same as the one already illustrated in FIG. 1, also provides that the piston 6 can be made of a soft elastic material, e.g. rubber, to generate the corresponding damping forces. In another configuration, an elastic piston could also be provided in the embodiment of FIG. 2.

As a result of the covering of the tubes 2, 3 or 4 by elastic material, there can also be a corresponding corrosion protection. Thus, corrosion protection can be provided without requiring painting of the finished component, In a simplest embodiment of the present invention, at least the inner tube 2 should preferably be coated at least on the exterior surface thereof with a protective coating to prevent any corrosion between the inner tube 2 and the outer tube 3, which corrosion could ultimately cause adherence of the tubes 2 and 3 together, thereby making the impact absorbing mount inoperable, Thus, with essentially no additional measures, corrosion protection can be provided, no welding is necessary, and a weight reduction of up to one kilogram per impact-absorbing bumper mount can be achieved. Thus, on a vehicle equipped with two appropriately mounted bumpers, a total weight reduction of approximately 4 kilograms can be possible.

One feature of the invention resides broadly in an impact-absorbing bumper mount with two telescoping tubes, in particular for motor vehicles, to decelerate a vehicle, by device of damping forces, when the vehicle strikes an obstacle, whereby a work piston is guided in a sealed manner in one of the tubes, characterized by the fact that the tubes 2, 3, 4 have recesses 1 and are coated with an elastic material 5 on their inside and outside.

Another feature of the invention resides broadly in the impact-absorbing bumper mount, characterized by the fact that the tubes 2, 3, 4 are roll-bent from sheet metal.

Still another feature of the invention resides broadly in the impact-absorbing bumper mount, characterized by the fact that the elastic material 5 is rubber or plastic.

Yet another feature of the invention resides broadly in the impact-absorbing bumper mount, characterized by the fact that the recesses 1 are holes.

Yet still another feature of the invention resides broadly in the impact-absorbing bumper mount, characterized by the fact that the recesses 1 are distributed uniformly over the surface.

Still yet another feature of the invention resides broadly in the-impact-absorbing bumper mount, characterized by the fact that when plastic is used, there is a glass fiber and/or carbon fiber reinforcement.

The invention as described hereinabove in the context of the preferred embodiments is not to be taken as limited to all of the provided details thereof, since modifications and variations thereof may be made without departing from the spirit and scope of the invention.

Nomenclature

1 Recesses
2 Tube
3 Tube
4 Tube
5 Elastic material
6 Piston
7 Seam
8 Opening
9 Coating
10 Flanges
11 Plug
12 Recess
13 Tube end
14 Fastening device

What is claimed is:

1. An impact absorbing bumper mount for mounting a bumper to a motor vehicle to absorb an impact of the motor vehicle during a collision with an obstacle, said mount comprising:

a first tubular member, the first tubular member defining a longitudinal axis, and said first tubular member having an interior surface and an exterior surface;

a second tubular member at least partially disposed within said first tubular member, said second tubular member being movable into and out of the first tubular member along the longitudinal axis of said first tubular member, and the second tubular member having an interior surface and an exterior surface;

means for attaching said first tubular member to one of the bumper and the motor vehicle;

means for attaching said second tubular member to the other of the bumper and the motor vehicle;

a work piston connected to the first tubular member;

said work piston being movably disposed within said second tubular member;

at least said second tubular member comprising a protective coating on at least the exterior surface thereof; and said protective coating being configured to minimize adherence of said first tubular member to said second tubular member.

2. The mount according to claim 1, wherein:

said means for attaching the second tubular member to the other of the bumper and the motor vehicle comprises a third tubular member;

said third tubular member comprises an interior surface and an exterior surface;

said second tubular member has a first end disposed within said first tubular member and a second end opposite to the first end;

said second end of said second tubular member comprises an orifice therethrough for receipt of said third tubular member therein;

said third tubular member comprises a protective coating on at least said outer surface thereof; and said coating of said third tubular member and said coating of said second tubular member comprise an integral coating formed as a unit about said exterior surfaces of said second and third tubular members.

3. The mount according to claim 2, wherein:

said coatings of said second and third tubular members comprise a polymeric coating material; and said exterior surfaces of said second and third tubular members comprise recesses therein, said recesses being configured to prevent movement of said coating material about said second and third tubular members.

4. The mount according to claim 3, wherein:

said recesses in said second and third tubular members comprise holes extending through said second and said third tubular members;

said second and said third tubular members further comprise a coating of polymeric material on said interior surfaces thereof; and said polymeric coating on said interior surfaces of said second and third tubular members and said polymeric coating on said exterior surfaces of said second and third tubular members comprise an integral coating passing through said holes and formed as a unit about said interior and exterior surfaces of said second and third tubular members.

5. The mount according to claim 4, wherein:

at least said second and said third tubular members comprise tubes formed of rolled sheet metal; and said polymeric material comprises one of:
rubber and plastic.

6. The mount according to claim 5, wherein said holes are distributed in a substantially regular, repeating pattern over said second and third tubular members.

7. The mount according to claim 6, wherein:

said holes are distributed in a substantially regular, repeating diagonal array wherein holes in a first row of holes are offset diagonally from holes in a second row of holes;

said plastic comprises one of:
glass fiber reinforcements, and
carbon fiber reinforcements;

said first tubular member comprises one of:
a rigid polymeric material; and
a rolled sheet metal having holes therethrough and coated on both said interior and exterior surfaces, with said coating being integral between said interior and exterior surfaces via said holes, said coating comprising one of:

plastic and rubber;

said work piston comprises a polymeric material;

said third tubular member divides said second tubular member into a first portion adjacent said second end of said second tubular member and a second portion disposed opposite to said first portion;

said first portion of said second tubular member is filled with said polymeric material;

said second portion of said second tubular member comprises a plug of polymeric material adjacent said third tubular member;

said second tubular member comprises a chamber therein between said work pistons and said plug of polymeric material adjacent said third tubular member;

said work piston comprises at least one sealing ring disposed thereabout between said work piston and said interior surface of said second tubular member;

said at least one sealing ring being configured to allow a predetermined flow of air out of said chamber upon a compression of said second tubular member into said third tubular member during the collision to thereby dampen the collision;

said first tubular member comprises a first closed end disposed opposite to said second tubular member;

said work piston being connected to said first closed end of said first tubular member for movement of said work piston within said second tubular member upon relative movement between said first and said second tubular members; and said work piston comprises at least four said sealing members disposed in spaced apart relationship with one another along a longitudinal axis of said work piston.

8. An impact absorbing bumper mount for mounting a bumper to a motor vehicle to absorb an impact of the motor vehicle during a collision with an obstacle, said mount comprising:

a first tubular member, the first tubular member defining a longitudinal axis, and said first tubular member having an interior surface and an exterior surface;

a second tubular member at least partially disposed within said first tubular member, said second tubular member being movable into and out of said first tubular member along the longitudinal axis of said first tubular member, and said second tubular member having an interior surface and an exterior surface;

means for attaching said first tubular member to one of the bumper and the motor vehicle;

means for attaching said second tubular member to the other of the bumper and the motor vehicle;

a work piston connected to said first tubular member;

said work piston being movably disposed within said second tubular member;

at least said second tubular member comprises:
a first rigid tubular member, said first rigid tubular member having an exterior surface disposed thereabout, and said first rigid tubular member comprising a plurality of spaced apart recesses in said exterior surface to reduce the weight of said first rigid tubular member.

9. The mount according to claim 8, wherein:

at least said second tubular member further has an interior surface;

said plurality of recesses comprise a plurality of holes disposed in a substantially regular pattern about said first rigid tubular member; and said second tubular member further comprises a coating material disposed at least upon said exterior of said first rigid tubular member and extending into said holes of said first rigid tubular member to fill in said holes.

10. The mount according to claim 9, wherein said first tubular member comprises one of:

a tubular member comprising substantially polymeric material; and a second rigid tubular member, said second rigid tubular member having:
an exterior surface,
an interior surface, and
a plurality of holes extending from said interior surface to said exterior surface to reduce the weight of said second rigid tubular member, said plurality of spaced apart holes being spaced apart at substantially regular intervals; and a coating material disposed at least upon said exterior of said second rigid tubular member.

11. The mount according to claim 10, wherein:

said means for attaching said second tubular member to said other of the bumper and the motor vehicle comprises a third tubular member;

said third tubular member comprises an interior surface and an exterior surface;

said second tubular member has a first end disposed within said first tubular member and a second end opposite to said first and;

said second end of said second tubular member comprises an orifice therethrough for receipt of said third tubular member therein;

said third tubular member comprises a plurality of holes extending from said interior surface to said exterior surface to reduce the weight of said third tubular member, said plurality of spaced apart holes being spaced apart at regular intervals; and said third tubular member comprises a protective coating on at least said exterior surface thereof.

12. The mount according to claim 11, wherein:

said first and second rigid tubular members comprise sheet metal rolled into tubes;

said coating material of said tubular members comprise a polymeric coating material disposed on the sheet metal; and said coating material of said third tubular member and said coating material of said second tubular member comprise an integral coating formed as a unit about said exterior surfaces of second and third tubular members to fasten said third tubular member to said second tubular member.

13. The mount according to claim 12, wherein:

said second and said third tubular members further comprise a coating of polymeric material on said interior surfaces thereof; and said polymeric coating on said interior surfaces of said second and third tubular members and said polymeric coating on said exterior surfaces of said second and third tubular members comprises an integral coating passing through said holes and formed as a unit about said interior and exterior surfaces of said second and third tubular members.

14. The mount according to claim 13, wherein:

said polymeric material comprises one of:
rubber;
plastic reinforced with glass fibers; and
plastic reinforced with carbon fibers;

said work piston comprises a polymeric material;

said third tubular member divides said second tubular member into a first portion adjacent said second end of said second tubular member and a second portion disposed opposite to said first portion;

said first portion of said second tubular member is filled with said polymeric material;

said second portion of said second tubular member comprises a plug of polymeric material adjacent said third tubular member;

said second tubular member comprises a chamber therein between said work piston and said plug of polymeric material adjacent said third tubular member;

said work piston comprises at least four sealing members for sealing said work piston to said interior surface of said second tubular member, said sealing members being spaced apart along said work piston in a direction along a longitudinal axis of said work piston;

said sealing members being configured to allow a predetermined flow of air out of said chamber upon a compression of said second tubular member into said third tubular member during the collision to thereby dampen the collision;

said first tubular member comprises a first closed end disposed opposite to said second tubular member; and said work piston being connected to said first closed end of said first tubular member for movement of said work piston within said second tubular member upon relative movement between said first and said second tubular members.

15. A method for producing impact absorbing bumper mounts for mounting a bumper to a motor vehicle to absorb an impact of the motor vehicle during a collision with an obstacle, the impact absorbing bumper mounts comprising: a first tubular member, the first tubular member defining a longitudinal axis and said first tubular member having an interior surface and an exterior surface; a second tubular member, said second tubular member having an interior surface, an exterior surface, a first end and a second end, and at least a portion of said second tubular member being disposed within said first tubular member; first attachment means for attaching said first tubular member to one of: the bumper and the motor vehicle; second attachment means for attaching said second tubular member to the other of the bumper and the motor vehicle; said second attachment means having an exterior surface; a work piston connected to said first tubular member and disposed within said second tubular member; at least the exterior surface of each of said second tubular member and said attachment means comprise an integral coating thereon between at least said second tubular member and said attachment means to connect together said second tubular member and said attachment means; and said method comprising the steps of:

forming said first tubular member;

disposing said work piston within said first tubular member, and attaching said work piston to said first tubular member;

forming said second tubular member;

providing said second attachment means;

disposing said second attachment means at least adjacent said first end of said second tubular member;

applying a coating material about at least the exterior surface of each of said second tubular member and said attachment means to form said integral coating between at least said second tubular member and said attachment means to connect together said second tubular member and said attachment means; and at least partially disposing said second end of said second tubular member within said first tubular member, and disposing said work piston within said second tubular member, said second tubular member being movable into and out of said first tubular member along the longitudinal axis of said first tubular member.

16. The method according to claim 15, wherein:

said second attachment means comprises a third tubular member;

said step of providing attachment means comprises providing said third tubular member, said third tubular member comprises an interior surface and an exterior surface;

said step of forming said second tubular member further comprises forming an orifice through said first end of said second tubular member for receipt of said third tubular member therein; and said step of disposing of said attachment means at least adjacent said first end of said second tubular member comprises inserting said third tubular member through said orifice of said second tubular member.

17. The method according to claim 16, wherein:

said step of applying a coating to said second tubular member and said second attachment means comprises applying a polymeric coating material to said second and third tubular members;

said step of forming of said second tubular member comprises forming said second tubular member from a material comprising a plurality of holes therethrough;

said step of providing said third tubular member comprises forming said third tubular member from a material comprising a plurality of holes therethrough; and said step of applying a polymeric coating further comprises additionally applying the polymeric coating material to said interior surfaces of said second and said third tubular members and filling said holes of said second and third tubular members to form an integral coating covering both said interior and exterior surfaces and extending through said holes.

18. The method according to claim 17, wherein:

said step of forming said second and said third tubular members comprise rolling sheet metal stock material having said plurality of holes therein into tubular shapes; and said step of applying a polymeric material comprises applying one of:
rubber; and
plastic.

19. The method according to claim 18, wherein:

said plurality of holes are distributed in a patterned regularity over said sheet metal stock;

said step of applying of the coating comprises one of:
spraying the coating material onto the surfaces; and
molding the coating material about the tubes;

said method further comprises:
forming said first tubular member from one of:
polymeric material; and
said sheet metal stock having said plurality of holes therein.

20. The method according to claim 19, wherein:

said step of forming said first tubular member from sheet metal stock additionally comprises;
applying an integral polymeric coating to said interior and exterior surfaces of said first tubular member; and
forming said first attachment means on said first tubular member from said coating material applied thereto said plastic comprises one of:
glass fiber reinforcements, and
carbon fiber reinforcements;

said work piston comprises a polymeric material;

said step of disposing of said third tubular member through said orifice of said first end of said second tubular member divides said second tubular member into a first portion adjacent said first end of said second tubular member and a second portion disposed opposite to said first portion;

said method further comprises:
substantially filling said first portion of said second tubular member with said polymeric material;
forming a plug of polymeric material within said second portion of said second tubular member adjacent said third tubular member;
forming a chamber within said second tubular member between said work piston and said plug of polymeric material adjacent said third tubular member;
configuring said work piston, with at least one sealing ring disposed thereabout between said work piston and said interior surface of said second tubular member, said at least one sealing ring being configured to allow a predetermined flow of air out of said chamber upon a compression of said second tubular member into said third tubular member during the collision to thereby dampen the collision;
providing a first closed end on said first tubular member opposite to said second tubular member; and
connecting said work piston to said first tubular member at said first closed end of said first tubular member for movement of said work piston within said second tubular member upon relative movement between said first and said second tubular members.

* * * * *

UNITED STATES PATENT AND TRADEMARK OFFICE
CERTIFICATE OF CORRECTION

PATENT NO. : 5,468,033
DATED : November 21, 1995
INVENTOR(S) : Wolfgang DOHRMANN and Metin AYYILDIZ It is certified that error appears in the above-indentified patent and that said Letters Patent is hereby corrected as shown below:

In column 5, line 37, before 'bumper', delete "the-impact-absorbing" and insert --the impact-absorbing--.

In column 7, line 34, Claim 7, after 'work', delete "pistons" and insert --piston--.

In column 8, line 52, Claim 11, after 'first', delete "and;" and insert --end;--.

Signed and Sealed this

Twenty-fourth Day of December, 1996

Attest:

BRUCE LEHMAN

Attesting Officer     Commissioner of Patents and Trademarks